United States Patent
Park (10) Patent No.: US 11,181,138 B2
(45) Date of Patent: *Nov. 23, 2021

(54) VARIABLE THREAD KNURL FASTENER

(71) Applicant: SIMPSON STRONG-TIE COMPANY, INC., Pleasanton, CA (US)

(72) Inventor: Jeremy Scott Park, Bethpage, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,606

(22) Filed: Mar. 26, 2013

(65) Prior Publication Data

US 2014/0294534 A1 Oct. 2, 2014

(51) Int. Cl.
*F16B 25/00* (2006.01)
*F16B 25/08* (2006.01)

(52) U.S. Cl.
CPC ...... *F16B 25/0052* (2013.01); *F16B 25/0057* (2013.01); *F16B 25/0063* (2013.01); *F16B 25/0073* (2013.01)

(58) Field of Classification Search
CPC .. F16B 25/0015; F16B 25/10; F16B 25/0052; F16B 25/0057; F16B 25/0063; F16B 25/0073
USPC ...................................... 411/386, 387.2, 311
See application file for complete search history.

(56) References Cited

U.S. PATENT DOCUMENTS

| | | | |
|---|---|---|---|
| 298,427 A | 5/1884 | Stone | |
| 470,804 A | 3/1892 | Jones | |
| 684,774 A | 10/1901 | Baggs | |
| 867,552 A | 10/1907 | Bradford et al. | |
| 1,151,861 A | 8/1915 | Brumback | |
| 1,175,665 A | 3/1916 | Sweet | |
| 1,238,636 A | 8/1917 | Christofferson | |
| 1,627,912 A | 5/1927 | Lomason | |
| 2,263,137 A | 11/1941 | Oestereicher | |
| 3,124,031 A | 10/1958 | Knohl | |
| 2,869,224 A * | 1/1959 | Forster | 29/240.5 |

(Continued)

FOREIGN PATENT DOCUMENTS

| | | |
|---|---|---|
| AU | 494077 | 10/1977 |
| CA | 2647663 A1 | 6/2010 |

(Continued)

OTHER PUBLICATIONS

International Search report and Written Opinion dated Oct. 2, 2013, in International Appl. No. PCT/US2013/051704 filed Jul. 23, 2013.

(Continued)

*Primary Examiner* — Flemming Saether
(74) *Attorney, Agent, or Firm* — Vierra Magen Marcus LLP (57) ABSTRACT

A fastener includes a shank having a point at a first end and a second, head end. A first portion of a thread is formed with a first thread angle and a second portion of the thread is formed with a second thread angle. One or more knurls are provided in the shaft in the threaded or unthreaded regions of the fastener. The thread may be serrated or jagged over one or more portions of the fastener, including the area of the first thread angle.

13 Claims, 7 Drawing Sheets

(56) References Cited

U.S. PATENT DOCUMENTS

| | | | |
|---|---|---|---|
| 3,093,784 A | 6/1963 | Mintzer | |
| 3,258,797 A | 7/1966 | Budd | |
| 3,478,369 A | 11/1969 | Joseph | |
| 3,478,639 A | 11/1969 | Gruca | |
| 3,661,046 A * | 5/1972 | Waud et al. | 411/369 |
| 3,682,507 A | 8/1972 | Waud | |
| 3,706,843 A | 12/1972 | Laub | |
| 3,724,315 A | 4/1973 | Sygnator | |
| 3,903,784 A | 9/1975 | Dekker | |
| 4,016,795 A | 4/1977 | Gill | |
| 4,034,641 A | 7/1977 | Williams, Jr. et al. | |
| 4,541,270 A | 9/1985 | Hanslik | |
| 4,653,244 A | 3/1987 | Farrell | |
| 4,655,661 A | 4/1987 | Brandt | |
| 4,834,602 A | 5/1989 | Takasaki | |
| 4,874,278 A | 10/1989 | Kawashita | |
| 4,878,793 A | 11/1989 | Hewison | |
| 5,015,134 A | 5/1991 | Gotoh | |
| 5,044,855 A | 9/1991 | Fukubayashi | |
| 5,046,905 A | 9/1991 | Piacenti et al. | |
| 5,171,186 A | 12/1992 | Lukes | |
| 5,199,839 A | 4/1993 | DeHaitre | |
| 5,209,753 A | 5/1993 | Biedermann et al. | |
| 5,482,418 A | 1/1996 | Giannuzzi | |
| 5,509,370 A | 4/1996 | Kovacs et al. | |
| 5,516,248 A | 5/1996 | Dehaitre | |
| 5,536,127 A | 7/1996 | Penning | |
| 5,551,818 A | 9/1996 | Koppel | |
| 5,570,983 A * | 11/1996 | Hollander | 411/386 |
| 5,759,003 A | 6/1998 | Greenway | |
| 5,779,417 A | 7/1998 | Barth et al. | |
| 5,827,030 A * | 10/1998 | Dicke | 411/387.4 |
| 5,897,280 A | 4/1999 | Dicke | |
| 5,987,837 A | 11/1999 | Nelson | |
| 6,000,892 A | 12/1999 | Takasaki | |
| 6,050,765 A | 4/2000 | McGovern et al. | |
| 6,056,491 A | 5/2000 | Hsu | |
| RE36,741 E | 6/2000 | Walther et al. | |
| 6,086,302 A | 7/2000 | Gerhard | |
| 6,086,303 A | 7/2000 | Fluckiger | |
| 6,109,850 A | 8/2000 | Commins | |
| 6,142,719 A | 11/2000 | Daublinger et al. | |
| 6,227,430 B1 | 5/2001 | Rosen et al. | |
| 6,250,866 B1 | 6/2001 | Devine | |
| 6,296,433 B1 | 10/2001 | Forsell et al. | |
| 6,302,631 B1 | 10/2001 | Takasaki et al. | |
| 6,328,516 B1 | 12/2001 | Hettich | |
| 6,332,741 B1 | 12/2001 | Janusz | |
| 6,514,026 B1 | 2/2003 | Gerhard | |
| 6,616,391 B1 | 9/2003 | Druschel | |
| 6,644,904 B2 | 11/2003 | Chen et al. | |
| 6,666,638 B2 | 12/2003 | Craven | |
| 6,698,987 B1 | 3/2004 | Dicke | |
| 6,739,815 B2 | 5/2004 | Takasaki | |
| 6,789,991 B2 * | 9/2004 | Hsu | 411/387.6 |
| 6,854,942 B1 | 2/2005 | Hargis | |
| 6,941,635 B2 | 9/2005 | Craven | |
| 6,976,818 B2 | 12/2005 | Levey et al. | |
| 7,037,059 B2 | 5/2006 | Dicke | |
| 7,090,453 B2 | 8/2006 | Lin | |
| 7,163,366 B2 * | 1/2007 | Chen | 411/417 |
| 7,293,947 B2 | 11/2007 | Craven | |
| 7,329,077 B2 | 2/2008 | Curtis | |
| 7,336,976 B2 | 2/2008 | Ito | |
| 7,402,016 B2 | 7/2008 | Yin-Feng | |
| 7,682,118 B2 * | 3/2010 | Gong et al. | 411/387.1 |
| 7,740,435 B2 | 6/2010 | Gstach et al. | |
| 7,862,279 B2 | 1/2011 | Stiebitz et al. | |
| RE42,207 E | 3/2011 | Janusz | |
| 8,182,185 B2 | 5/2012 | Gahn et al. | |
| 8,182,186 B2 | 5/2012 | Huber et al. | |
| 8,337,131 B2 | 12/2012 | Hettich | |
| 8,348,571 B2 | 1/2013 | Shih | |
| 8,360,702 B2 | 1/2013 | Yu | |
| D678,758 S | 3/2013 | Ross | |
| 8,430,618 B2 * | 4/2013 | Baer et al. | 411/387.2 |
| 8,858,145 B2 | 10/2014 | Su | |
| 9,482,258 B2 | 11/2016 | Park | |
| 9,494,179 B2 * | 11/2016 | Langewiesche | |
| 9,850,935 B2 * | 12/2017 | Shih | |
| 2002/0114682 A1 | 8/2002 | Forster | |
| 2003/0026675 A1 | 2/2003 | McGovern et al. | |
| 2003/0235483 A1 | 12/2003 | Chen | |
| 2004/0141827 A1 | 7/2004 | Dicke | |
| 2004/0197139 A1 | 10/2004 | McGovern et al. | |
| 2005/0079031 A1 | 4/2005 | Mizuno et al. | |
| 2006/0269380 A1 | 11/2006 | Yin-Feng | |
| 2007/0055236 A1 | 3/2007 | Hudgins et al. | |
| 2007/0128001 A1 | 6/2007 | Su | |
| 2007/0166124 A1 | 7/2007 | Hsu | |
| 2007/0217887 A1 | 9/2007 | Lin | |
| 2007/0224019 A1 | 9/2007 | Hale | |
| 2007/0269287 A1 | 11/2007 | Runge | |
| 2007/0286701 A1 | 12/2007 | Hsu | |
| 2008/0080951 A1 | 4/2008 | Lin | |
| 2009/0028665 A1 * | 1/2009 | Chang | |
| 2009/0092463 A1 | 4/2009 | Oberndorfer et al. | |
| 2009/0112269 A1 | 4/2009 | Lieberman et al. | |
| 2009/0162165 A1 | 6/2009 | Chen | |
| 2010/0047035 A1 | 2/2010 | Rosenkranz et al. | |
| 2011/0110745 A1 | 5/2011 | Shih | |
| 2011/0217145 A1 | 9/2011 | Kochheiser et al. | |
| 2011/0280684 A1 | 11/2011 | Lai | |
| 2012/0251268 A1 | 10/2012 | Yu | |
| 2012/0294693 A1 * | 11/2012 | Gonciarz | F16B 25/0052 411/387.1 |
| 2013/0039720 A1 * | 2/2013 | Shih | 411/387.4 |
| 2015/0010374 A1 | 1/2015 | Park | |

FOREIGN PATENT DOCUMENTS

| | | |
|---|---|---|
| DE | 8329783 U1 | 6/1985 |
| DE | 4439535 A1 | 5/1996 |
| DE | 29621922 U | 4/1998 |
| DE | 19846993 | 4/2000 |
| DE | 19846993 A1 | 4/2000 |
| DE | 202004011145 | 9/2004 |
| DE | 202004011145 U1 | 9/2004 |
| DE | 202005006493 U1 | 6/2005 |
| DE | 102008048703 A1 | 3/2010 |
| DE | 102008057678 A1 | 5/2010 |
| DE | 202010016409 U | 2/2011 |
| DE | 202011100618 U1 | 9/2011 |
| EP | 0012441 A1 | 6/1980 |
| EP | 1411252 | 4/2004 |
| EP | 1411252 A2 | 4/2004 |
| EP | 2092995 A2 | 8/2009 |
| EP | 2289647 A1 | 3/2011 |
| EP | 2317159 A1 | 5/2011 |
| GB | 2227540 A | 8/1990 |
| GB | 2235744 A | 3/1991 |
| GB | 2454464 A | 5/2009 |
| JP | H087135 Y2 | 4/1991 |
| JP | 2002349528 A | 12/2002 |
| JP | 2011106587 A | 6/2011 |
| WO | 93/23680 | 11/1993 |
| WO | WO 2014/160584 A1 | 10/2014 |
| WO | WO 2016/048822 A1 | 3/2016 |

OTHER PUBLICATIONS

Office Action dated Nov. 5, 2009, in U.S. Appl. No. 12/142,082, filed Jun. 19, 2008.

Amendment dated May 4, 2010, in U.S. Appl. No. 12/142,082, filed Jun. 19, 2008.

Office Action dated Jul. 13, 2010, in U.S. Appl. No. 12/142,082, filed Jun. 19, 2008.

Amendment dated Jan. 13, 2011, in U.S. Appl. No. 12/142,082, filed Jun. 19, 2008.

Office Action dated Feb. 28, 2013, in U.S. Appl. No. 12/142,082, filed Jun. 19, 2008.

Amendment dated Aug. 27, 2013, in U.S. Appl. No. 12/142,082, filed Jun. 19, 2008.

(56) References Cited

OTHER PUBLICATIONS

Office Action dated Oct. 3, 2013, in U.S. Appl. No. 12/142,082, filed Jun. 19, 2008.
International Search report and Written Opinion dated Jul. 1, 2014, in International Appl. No. PCT/US2014/031324 filed Mar. 20, 2014.
Amendment dated Apr. 2, 2014, in U.S. Appl. No. 12/142,082, filed Jun. 19, 2008.
Notice of Allowance dated Jul. 25, 2014, in U.S. Appl. No. 12/142,082, filed Jun. 19, 2008.
Schmid Schrauben Hainfeld Gmbh, Rapid Komprex, retrieved from website on Sep. 14, 2013: http://www.schrauben.at/files/rapid_komprex.pdf.
DIBT, Approval communication for Reg. No. Z-9.1-564, Jul. 1, 2008.
Amendment dated Jun. 13, 2016, in U.S. Appl. No. 14/493,029, filed Sep. 22, 2014.
Notice of Allowance dated Jul. 19, 2016, in U.S. Appl. No. 14/493,029, filed Sep. 22, 2014.
Notice of Allowance dated Sep. 1, 2016, in U.S. Appl. No. 14/493,029, filed Sep. 22, 2014.
Office Action dated Dec. 21, 2015, in U.S. Appl. No. 14/493,029, filed Sep. 22, 2014.
International Preliminary Report on Patentability dated Oct. 8, 2015, in International Appl No. PCT/US2014/031324 filed Mar. 20, 2014.
International Search report and Written Opinion dated Dec. 4, 2015, in International Appl No. PCT/US2015/050918 filed Sep. 18, 2015.
Notification of International Preliminary Report on Patentability dated Apr. 6, 2017, in International Patent Appl. No. PCT/US2015/050918 filed Sep. 18, 2015.
Amendment dated Feb. 28, 2018, in European Patent Appl. No. 15772159.8.
Exam Report dated Jul. 17, 2017, in New Zealand Patent Appl. No. 713336.
Examination Report dated Mar. 7, 2018, in New Zealand Patent Appl. No. 713336.
Amendment dated May 2, 2018, in Australian Patent Appl. No. 2014241729.
Australian Patent Appl. No. 2018203140 filed May 7, 2018.
Response to Examination Report dated Jul. 3, 2018, in New Zealand Patent Appl. No. 713336.
Examination Report dated Jul. 13, 2018, in New Zealand Patent Appl. No. 713336.
New Zealand Patent Appl. No. 744347 filed Jul. 16, 2018.
Examination Report dated Sep. 14, 2018, in Australian Patent Appl. No. 2015321710.
Voluntary Amendments filed Nov. 23, 2018, New Zealand Patent Application No. 744348.
Examination Report dated May 4, 2018, in Australian Patent Appl. No. 2014241729.
Examination Report dated Nov. 29, 2018, in Australian Patent Appl. No. 2018203140.
TW 104131311—Office Action dated Jan. 31, 2020, 7 pages.
AU 2018203140—Response to Examination Report dated Nov. 29, 2018, filed Nov. 28, 2019, 17 pages.
AU 2018203140—Response to Examination Report dated Nov. 29, 2018, filed Nov. 29, 2019, 6 pages.
Notice of Allowance dated Jul. 10, 2019, U.S. Appl. No. 14/536,071.
Response to Canadian Exam Report dated Jul. 29, 2019, Canadian Patent Application No. 2873235.
Canadian Exam Report dated Feb. 5, 2020, Canadian Patent Application No. 2,907,754.
Response to Canadian Exam Report dated Aug. 24, 2020, Canadian Patent Application No. 2,907,754.
European Exam Report dated May 21, 2019, European Patent Application No. 14716742.3.
Response to European Exam Report dated Mar. 19, 2020, European Patent Application No. 14716742.3.
New Zealand First Examination Report dated Jun. 9, 2020, New Zealand Patent Application No. 730796.
Response to New Zealand Office Action dated Jun. 12, 2019, New Zealand Patent Application No. 744348.
New Zealand Further Examination Report dated Jul. 8, 2019, New Zealand Patent Application No. 744348.
Response to Examination Report dated Nov. 8, 2019, New Zealand Patent Application No. 744348.
Taiwan Office Action dated Jun. 13, 2019, Taiwan Patent Application No. 104131311.
Response to Taiwan Office Action dated Dec. 16, 2019, Taiwan Patent Application No. 104131311.
Response to Taiwan Office Action dated Jul. 30, 2020, Taiwan Patent Application No. 104131311.
Australian Exam Report dated Oct. 30, 2020, Australian Patent Application No. 2019272060.
Notice of Allowance dated Dec. 23, 2020 in Canadian Application No. 2,907,754.
Response to First Examination Report dated Jan. 5, 2021 in New Zealand Application No. 730796.
Notice of Allowance dated Dec. 7, 2020 in Canadian Application No. 2,907,690.
Response to Examination Report dated May 18, 2021 in New Zealand Patent Application No. 730796.
Examination Report dated Feb. 3, 2021 in New Zealand Patent Application No. 730796.
Canadian Exam Report dated Sep. 9, 2021, Canadian Patent Application No. 2,961,409.

\* cited by examiner

VARIABLE THREAD KNURL FASTENER

BACKGROUND

Fastener designs have been used to improve specific characteristics fasteners in different materials. Ultimately, the fastener needs to bind one material to another securely and efficiently. Screw-type fasteners generally include a threaded shank with a pointed tip at one end thereof and a head at the other end. The head has a recess for accepting a driver tip. Some heads are designed to be recessed in a fastened material, while others are designed to embed into the material so that the head is flush with a surface of the bound material.

SUMMARY

Technology is described herein which provides a unique fastener. The fastener includes a shank having a tip at a first end and a head at a second end. A contiguous helical thread formed from the tip toward the second end with a first thread angle extending from and beginning at the tip and extending toward the second end, and a second thread angle. The first thread angle is greater than the second thread angle and at least a portion of the contiguous helical thread including a serrated edge. At least one knurl positioned in the shaft within an area of the first thread angle. Multiple knurls may be provided. For example, a second knurl may be provided at a distance apart on the shank from the first knurl.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technology described herein is a fastener having features allowing securing elements in wood, composite or other material and providing improved performance.

The technology includes a threaded fastener having a varied thread angle. A first portion of the thread is formed with a first thread angle and a second portion of the thread is formed with a second thread angle. In one embodiment, the first thread angle is greater than the second and is formed in the thread at the leading or tip end of the fastener. In addition, one or more knurls are provided in the shaft in the threaded or unthreaded regions of the fastener. The thread may be serrated or jagged over one or more portions of the fastener, including the area of the first thread angle. Various embodiments of variable thread knurl fasteners are described herein. One embodiment of the fastener includes a shank having a first region with a generally cylindrical cross-section with a helical thread, followed by a thread-free shank section. The first section has a first portion with a first thread angle and a second portion with a second thread angle. In one embodiment, this is combined with at "type 17" screw point.

One or more knurl sections and one or more thread angle changes may be provided in the fastener. In one embodiment, the pitch of the thread is constant. In one embodiment the thread extends over the entire shank and in another embodiment, the thread covers only a partial length of the shank. The cross-sections may be formed to a length approximately equal to the pitch of the helical thread.

A first embodiment of the fastener technology will be described with respect to FIGS. 1-6.

The fastener 100 of FIGS. 1-5 includes a shank 102 having a pointed tip 104 at one end thereof and a head 140 at another end. The shank may be formed of galvanized steel, though other materials may be used. The first section 116 extends from pointed tip 104 to second section 120. The body of the shank has a minor diameter D2 (FIG. 4) in first section 116. The second section 120 has a diameter D1, which may be greater than or equal to D2.

Figure 1:
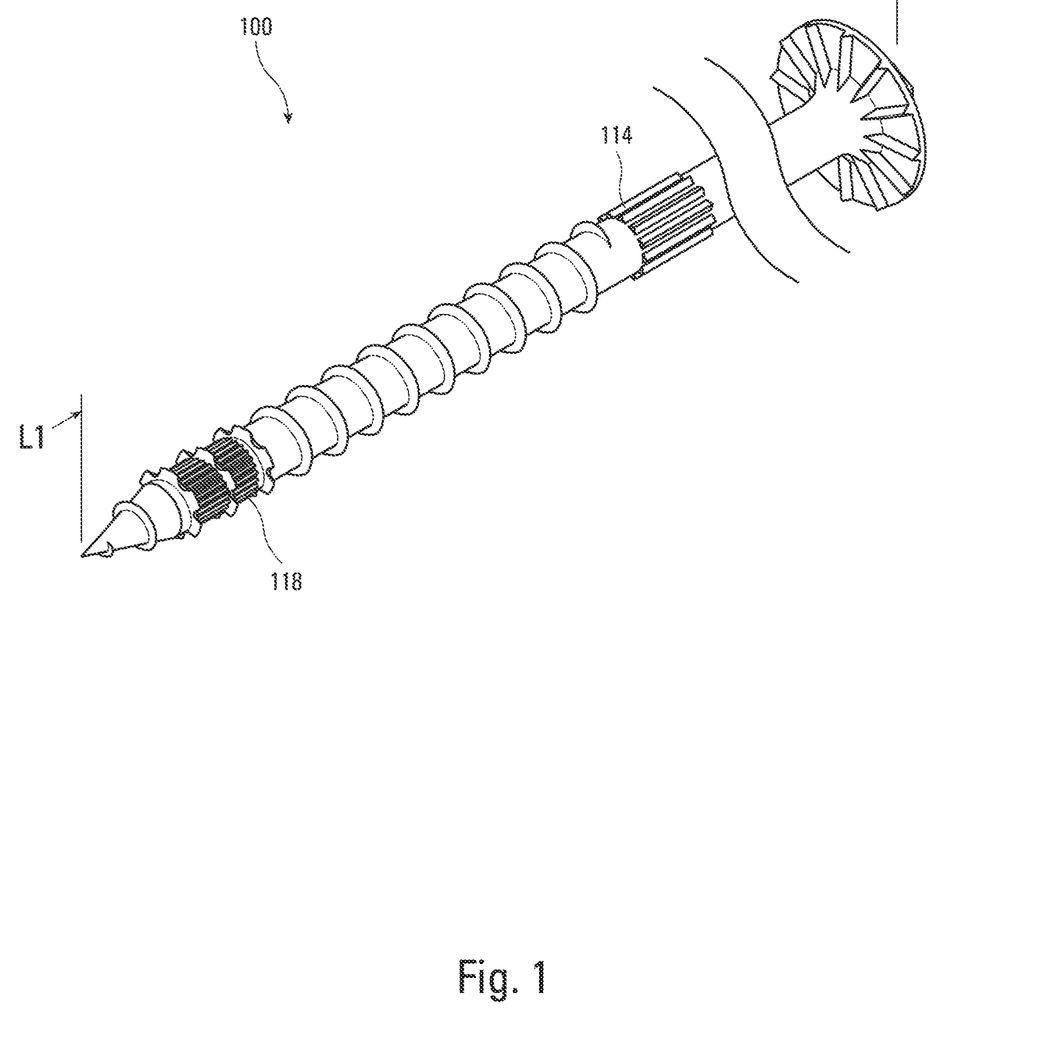
FIG. 1 is a perspective view of a first embodiment of a fastener in accordance with the present technology.
Figure 2:
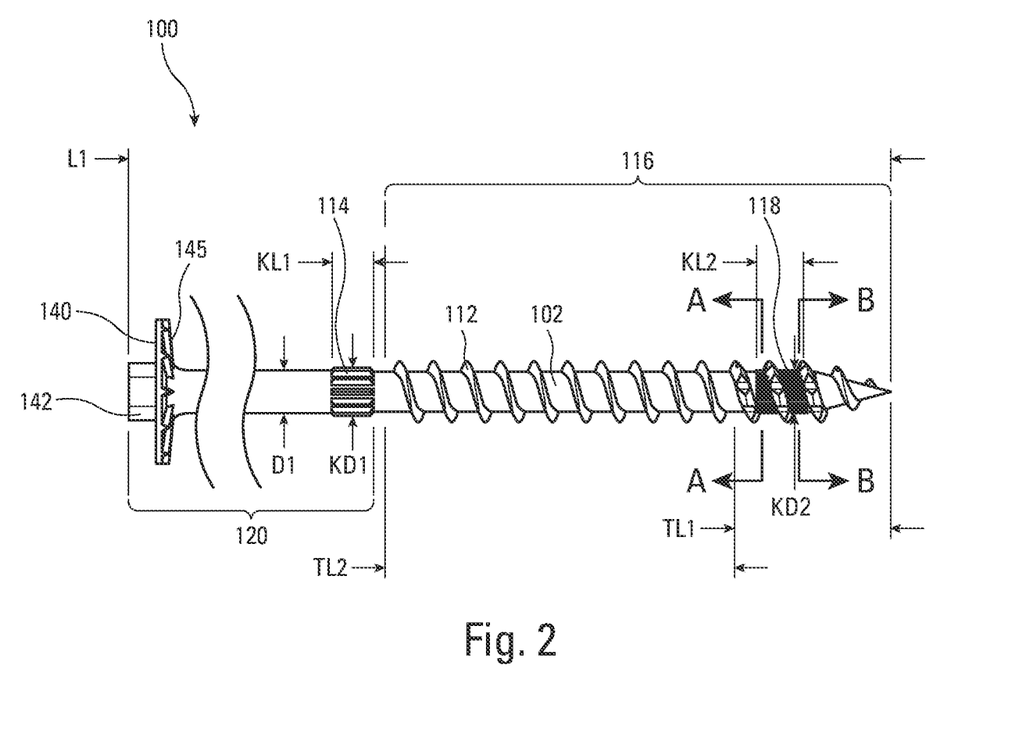
FIG. 2 depicts a plan view of a first embodiment of a fastener in accordance with the present technology.
Figure 3:
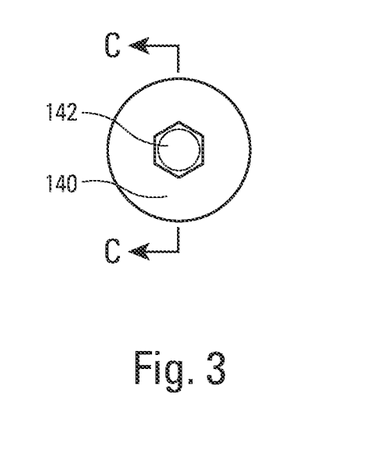
FIG. 3 depicts an end view.
Figure 4:
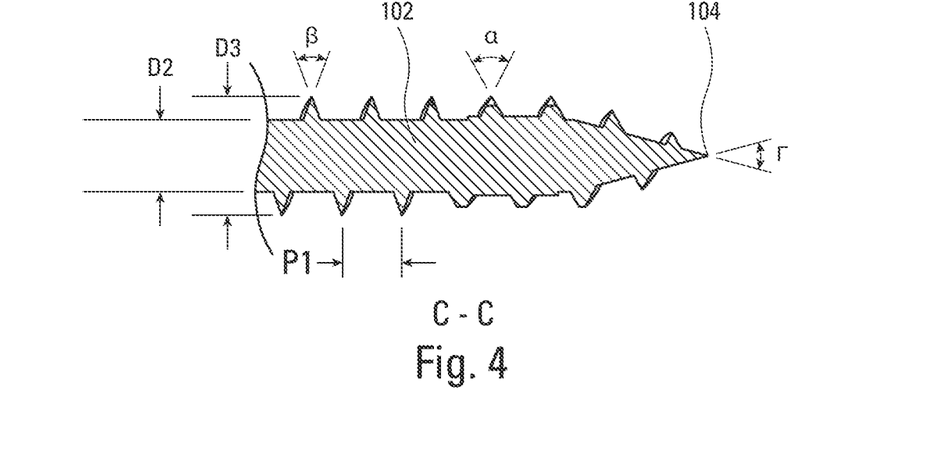
FIG. 4 partial cut-away view along line C-C of FIG. 3.
Figure 5:
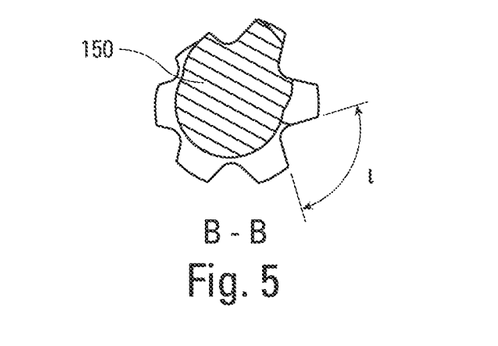
FIG. 5 is a cross-section view along line B-B in FIG. 1.
Figure 6:
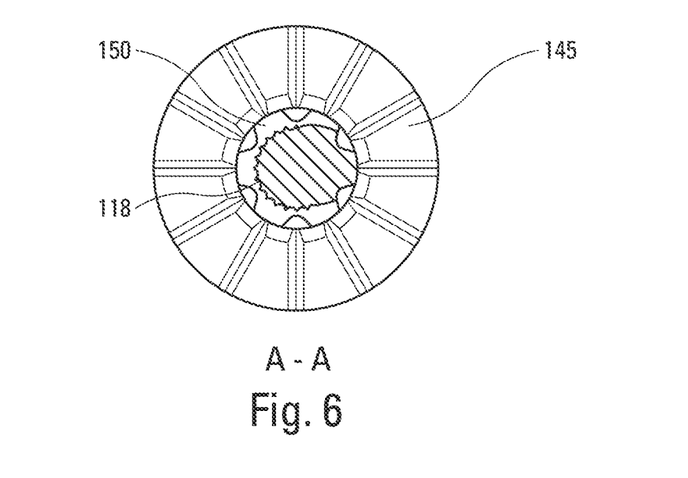
FIG. 6 is a cross section view along line A-A in FIG. 1.

The shank in region 120 has a cylindrical cross-section and in this embodiment comprises an unthreaded region.

Two knurls 114 and 118 are provided in the respective second section 120 and first section 116. Knurl 118 has a knurl diameter KD2 which is 1.1-1.3 times the minor diameter D2. Knurl 114 has diameter KD1 which may be the same as or different than diameter KD2. In one embodiment, KD1 has a diameter which is 1.1-1.3 times shank diameter D1 and which is the same as or greater than KD2 by a ratio of 0.8-1.2.

A first section 116 of the shank includes a helical thread 112 formed on the shank 102 extending to the tip 104. The shank in section 116 has a generally cylindrical shank diameter D2 and the thread has a diameter D3 which is approximately 1.5-1.75 times D2. The thread 112 has an effective thread height above the shank in the section 116 equivalent to $((D3-D2)/2)$ and a pitch P.

In the embodiment 100, two knurls (114, 118) are provided, but in other embodiments only one knurl is used. Where one knurl is used, the knurl may be in the threaded section (116) or the unthreaded section (120). The knurls may be the same or different sizes, as described above. Each knurl has a knurl length KL. Knurl 114 has a knurl length KL1 and knurl 118 has a knurl length KL2. KL1 and KL2 may be the same or different. In the embodiment of FIGS. 1-5 the length of KL1 to KL2 may vary over a ratio of KL1:KL2 of about 1.5-0.9.

In one embodiment, thread 112 is divided into a first length (or region) TL1 and a second length (or region) TL2, with TL1 extending from pointed tip 104 toward second section 120. The thread in region TL1 includes a serrated edge defined by a plurality of teeth 150 illustrated in FIG. 4. The Teeth may be formed by 90 degree gaps spaced at 60 degree intervals in thread 112. Other serration formations may be used. Region TL1 extends just beyond knurl 118 in section 116 of shank 102.

In a further unique aspect of the technology, the thread has a variable thread angle along the length of section 116. A first portion of the thread in region TL1 has a thread angle α while a second portion of the thread has a thread angle β, where α is greater than β. In one embodiment, α is 55-65 degrees and β is 35-45 degrees. The thread angle β may be maintained through region TL2. In one embodiment TL2 is greater than TL1 by about 2.15-2.5 times.

In various embodiments, the total length L1 of the fastener may vary between 4-12 inches. In such embodiments, for any change in length L1, the length of section 116 remains constant, with a change in the length of section 120 extending the length of the fastener. In such embodiments, a length of section 116 may be about 3 inches and the position of knurl 118 remains adjacent to section 116 irrespective of the length of section 120. Alternatively, additional knurls may be provided in section 116 or section 120.

When constructed in accordance with the foregoing description, the torque required to install a fastener is greatly reduced. Table 1 is a comparison of three different fastener constructions: a standard thread (column C) with no serrations or knurls, a serrated thread (column A) and a thread/knurl/variable thread fastener constructed as in the present description of FIGS. 1-6. (column B) As illustrated therein the average torque required for comparable lengths of penetration into a wood surface was substantially less when both the serrated edge and knurls 114 and 118 were provided.

| Test No. | A | | B | | C | |
| --- | --- | --- | --- | --- | --- | --- |
| | Torque @ 4.5" | Penetration | Torque @ 4.5" | Penetration | Torque @ 4.5" | Penetration |
| 1 | 36.3 | 4.496 | 24.5 | 4.472 | 48.1 | 4.514 |
| 2 | 49.0 | 4.496 | 25.3 | 4.502 | 45.6 | 4.508 |
| 3 | 43.1 | 4.496 | 32.1 | 4.532 | 46.4 | 4.520 |
| 4 | 43.1 | 4.508 | 29.6 | 4.514 | 46.4 | 4.490 |
| 5 | 43.9 | 4.490 | 30.4 | 4.484 | 47.3 | 4.514 |
| 6 | 39.7 | 4.520 | 24.5 | 4.472 | 46.4 | 4.526 |
| 7 | 43.9 | 4.490 | 23.6 | 4.490 | 47.3 | 4.490 |
| 8 | 38.0 | 4.502 | 29.6 | 4.520 | 42.2 | 4.502 |
| 9 | 43.1 | 4.520 | 22.8 | 4.484 | 49.0 | 4.508 |
| 10 | 45.6 | 4.520 | 32.9 | 4.520 | 43.9 | 4.502 |
| AVG. | 41.9 | 4.505 | 27.5 | 4.499 | 46.3 | 4.507 |

Head 140 may be any standard head, but in the embodiment of FIGS. 1-6, a hex nut head fastened to a disk 145. The underside of the disk 145 may include nibs which help the disk engage a surface of the product being fastened. In one embodiment, twelve (12) locking teeth or nibs are formed in the bottom surface of the disk.

FIGS. 7-11 illustrate an alternative embodiment of the technology. The fastener is similar to that of FIGS. 1-6 except that the thread runs the entire length of the shaft, the portion of the wider thread region extending from the tip is longer, the serrated section is longer and the fastener includes a "type 17" point. It should be recognized that a type 17 point may be utilized with the embodiment of FIGS. 1-6.

In the embodiment of FIGS. 7-11, a fastener 200 has a total length L2, includes a shank 202 having a first section 220 and a second section 225. The first portion includes a tip 204, a serrated portion of thread 212, a thread portion having a thread angle Θ which is larger than a thread angle Σ. Region 220 has a total length TL3 is less than the length TL4 of section 225 by about 3.5-3.8 times. In one embodiment, Θ is 55-65 degrees and Σ is 30-45 degrees.

The shank 202 has a generally cylindrical shank diameter D4 and the thread has a diameter D5 which is approximately 1.4-1.5 times D4. The thread 212 has an effective thread height above the shank equivalent to ((D5−D4)/2) and a pitch P4.

One knurl 224 is provided in the first section 220. Knurl 224 has a knurl diameter KD4 which is 1.002-1.25 times the minor diameter D4. Knurl 224 has a length KL4 which in the embodiment of FIGS. 6-9 is equivalent to two times P4. The knurl length may be shorter or longer.

Helical thread 212 formed on the shank 202 extends from the tip 204 to head 240. In the embodiment, one knurl is provided, but in other embodiments multiple knurls are used. Where one knurl is used, the knurl may be in the threaded section 220 with thread angle Θ, and may be positioned just after the tip reaches diameter D4 in the threaded section (220). If multiple knurls are used, the knurls may be the same or different sizes, as illustrated above.

In one embodiment, thread 212 is divided into a first section 220 of length TL3 and a second section 225 of length TL4, with TL3 extending from tip 204 toward second section 225. The thread in length TL3 includes a serrated edge defined by a plurality of teeth 250. The teeth may be formed by 90 degree gaps in thread 112 positioned at 60 degree intervals.

The screw is designed to be a self-boring screw into the material to be fastened. However, a pilot hole may be utilized. #

Figure 7:
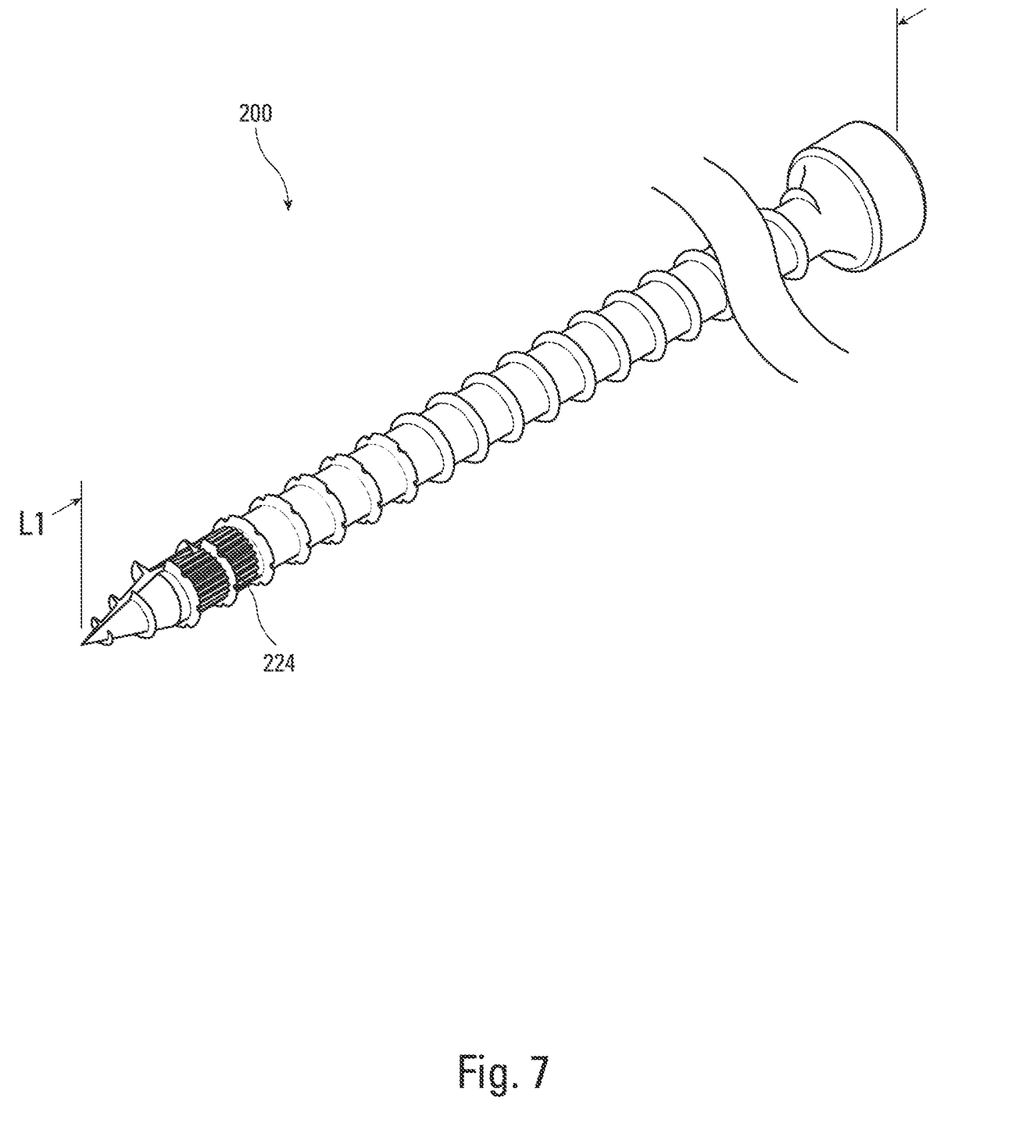
FIG. 7 is perspective view of another embodiment of the fastener in accordance with the present technology.
Figure 8:
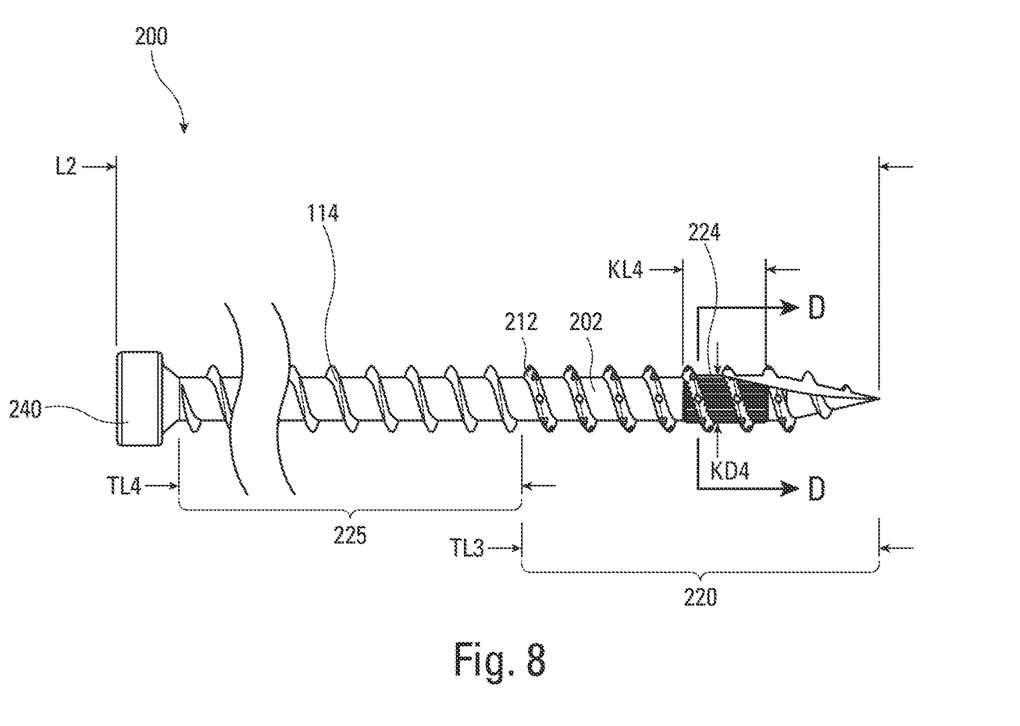
FIG. 8 depicts a plan view of a second embodiment of a fastener in accordance with the present technology.
Figure 9:
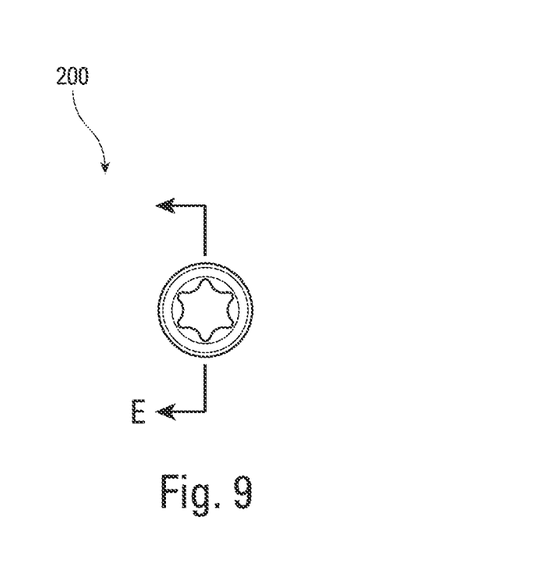
FIG. 9 is an end view of the fastener of FIG. 7.
Figure 10:
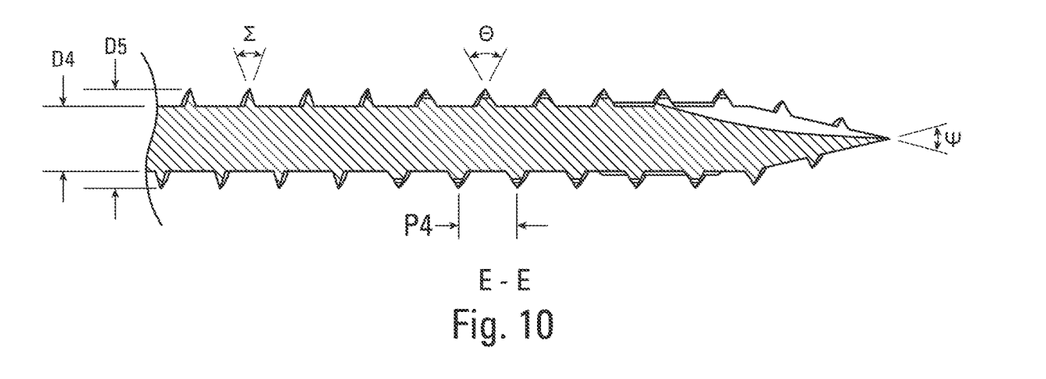
FIG. 10 depicts a partial cut-away view along line E-E in FIG. 9.
Figure 11:
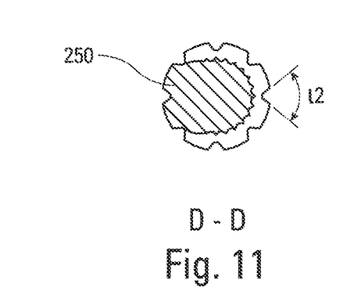
FIG. 11 is a cross section view along line D-D in FIG. 9.

A head 240 is provided at the other end of the shank 202. The head comprises hexalobular drive head, but may alternatively take the form of head 240 and/or have, a Phillips recess, a square or other shaped recess formed in the top of the head 240 to receive a driver.

Figure 12:
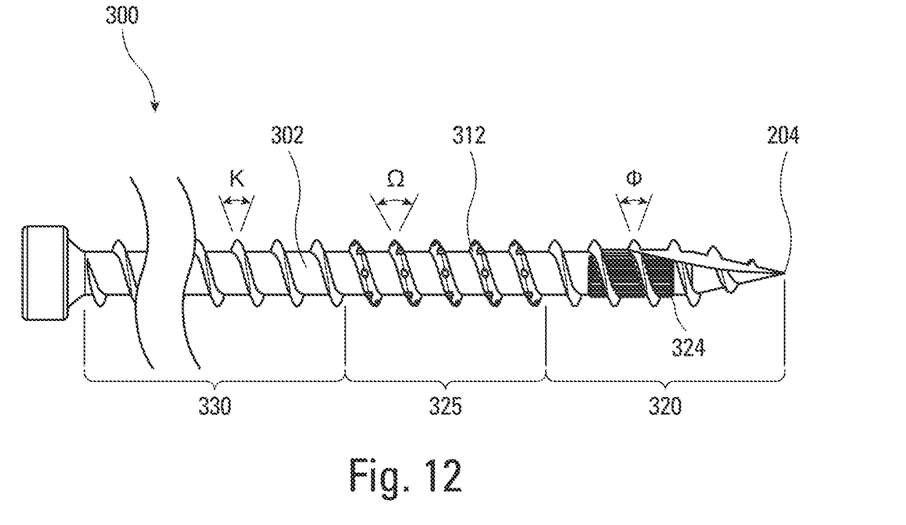
FIG. 12 depicts another embodiment of the fastener in accordance with the present technology.

FIG. 12 illustrates a third embodiment of a fastener 300 wherein a first and second thread angles are used in conjunction with one or more knurls and a serrated edge thread. In this embodiment the thread angle Φ extends for a first portion 320 of the thread, then the thread in portion 325 has a thread angle Ω, and a third portion 330 of the thread has a thread angle K. In one embodiment, K and Φ are equal. In another embodiment, they are different. In one embodiment angle Φ is less than Ω and approximately equal to K. In one embodiment, Ω is 55-65 degrees and K and Φ are between 30-45 degrees.

The thread may extend the entire length of shank 302, or a portion thereof. While only one knurl is illustrated, multiple knurls may be used.

Figure 13:
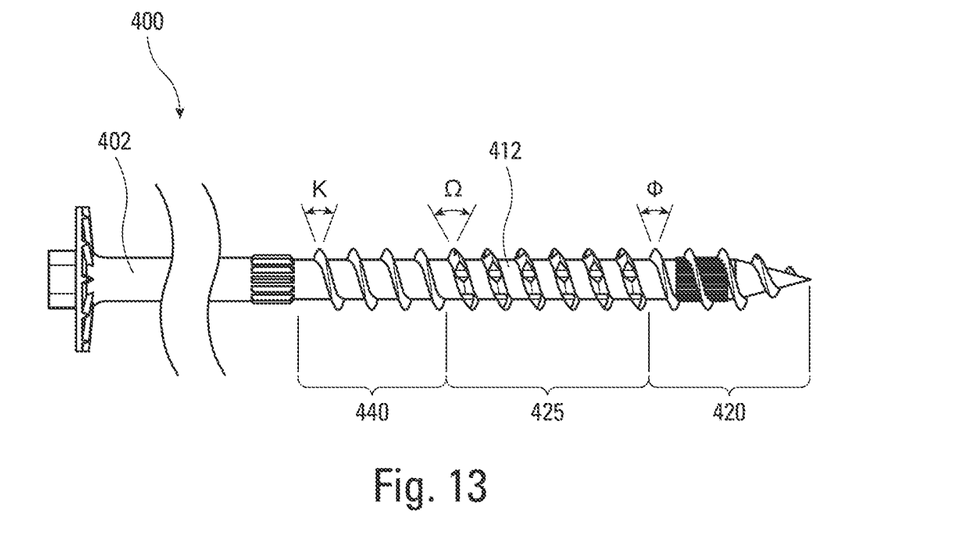
FIG. 13 depicts yet another embodiment of a fastener in accordance with the present technology.

FIG. 13 illustrates a fourth embodiment of fastener of the present technology. This embodiment is similar to the embodiment of FIG. 10 except that the fastener 400 having a shank 402 includes a thread-free section 450, and three thread portions having angles K, Ω and Φ are shown. First section 410 has a thread with angle Φ equivalent to previous embodiments; section 415 has a serrated thread with angle Ω equivalent to previous embodiments; and section 440 has a thread with angle K equivalent to previous embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
a shank having a point at a first end and a head at a second end defining a total fastener length, the shank including
a first section having a first diameter, the first section of the shank including a thread, the thread in the first section adjacent to the first end and including a first region having multiple turns about the shank in said first section and having a first thread angle, and a second region between the first region and the second end having multiple turns of the thread, the thread in the second region with a second, different thread angle smaller than the first thread angle, at least a portion of the thread in the first region having a serrated edge;
a first cylindrical knurl having a first end and a second end, the knurl limited in position to the first region of the first section of the shank and within an area of the first thread angle, the first cylindrical knurl having knurling comprising a plurality of straight ridges, each of the ridges extending along a knurl length between the first end of the knurl and the second end of the knurl and being parallel to the total fastener length of the shank, each of the ridges having a symmetrical cross-section relative to a radial axis extending perpendicular to the shank and having a height no greater than a first knurl diameter minus the diameter in the first section; and
a second section of the shank comprising a thread free region, the second section including a second knurl having a second knurl diameter;
wherein the thread has a diameter which is 1.5-1.75 times the first diameter of the shank, wherein the first knurl diameter and the second knurl diameter each have a maximum diameter of 1.3 times the first diameter of the shank, such that the first and second knurl diameters are less than the diameter of the thread.

2. The fastener of claim 1 wherein the first knurl is longer than the second knurl.

3. The fastener of claim 1 wherein the first section begins at and extends from the point toward the head, and wherein each thread angle is formed by a leading and trailing edge of the thread, each edge being non-normal with respect to a surface of the shank.

4. The fastener of claim 1 wherein the second knurl is provided in second section closer to the first section than the head.

5. A fastener, comprising:
a shank having a tip at a first end and a head at a second end defining a fastener length, the shank including
a first section having a first section length and diameter formed at the first end and having a contiguous helical thread, the contiguous helical thread having multiple turns about the shank and a first thread angle in a first region of the first section, the first region being adjacent the tip and extending toward the second end, and the contiguous helical thread having multiple turns about the shank and a second thread angle smaller than the first thread angle in a second region of the first section having the diameter, the second portion region positioned between the first region and the second end;
the first section including a first cylindrical knurl having straight knurling comprising a plurality of straight ridges, each of the ridges extending along a knurl length between a first end of the first cylindrical knurl and a second end of the first cylindrical knurl, each end of the first cylindrical knurl being positioned within the first region of the first section and thereby limited to a position within the first region, the straight ridges defining a knurl diameter, the knurl length comprising a portion of the length of the shank and parallel to the length of the shank, each of the ridges having a symmetrical cross-section relative to a radial axis extending perpendicular to the shank and having a height no greater than the first knurl diameter minus the first diameter in the first section; and
a second, thread free section having a second section length between the first section and the head, the second section including a second knurl having a second knurl diameter,
wherein the thread has a diameter which is 1.5-1.75 times the first diameter of the first section, wherein the first knurl diameter and the second knurl diameter each have a maximum diameter of 1.3 times the first diameter, such that each knurl diameter is less than the diameter of the thread.

6. The fastener of claim 5 the second knurl comprising a second plurality of separated straight ridges, each of the ridges extending along a second knurl length which is a portion of the length of the shank and parallel to the length of the shank, the second knurl having a length longer than the first knurl.

7. The fastener of claim 6 wherein first knurl has diameter which may be the same as or different than a diameter of the second knurl by a ratio of 0.8-1.2.

8. The fastener of claim 6 wherein the first angle is in a range of about 55-65 degrees and the second angle is in a range of about 30-45 degrees.

9. A fastener, comprising:
a shank having a tip at a first end and a head at a second end, the first end and second end defining a fastener length, the shank having a first diameter between the tip and the second end and including
a first fastener section including a contiguous helical thread formed from and beginning at the tip and extending toward the second end, the contiguous helical thread having multiple turns about the shank having said first diameter, the contiguous helical thread having a first thread angle in a first region of the first region which is adjacent the tip and extending toward the second end, and a second thread angle smaller than the first thread angle in a second region of the contiguous helical thread;
a first cylindrical knurl positioned in the first fastener section of the shank along a knurl length between a first end of the first cylindrical knurl and a second end of the first cylindrical knurl, each end of the first cylindrical knurl being positioned within the first region of the first section, the first cylindrical knurl thereby limited to a position within the first region, the first cylindrical knurl having a first knurl diameter greater than the first diameter of the shank and comprising a first plurality of separated straight ridges, each of the ridges having a symmetrical cross-section relative a radial axis extending perpendicular to the shank and extending along the first knurl length which is a portion of the length of the shank and parallel to the length of the shank, the first cylindrical knurl having a height no greater than the first knurl diameter minus the first diameter in the first region;
a second knurl provided in a second, thread-less fastener section at a distance on the shank apart from the first knurl, the second knurl comprising a second plurality of separated straight ridges, each of the ridges extending along a second knurl length which is a portion of the length of the shank and parallel to the length of the shank, the second knurl having a second knurl diameter; and wherein the helical thread has a diameter which is 1.5-1.75 times the diameter of the shank, wherein the first knurl diameter and the second knurl diameter have a maximum diameter less than the diameter of the thread.

10. The fastener of claim 9 wherein the second knurl has a length greater than a length of the first knurl.

11. The fastener of claim 10 wherein the first knurl diameter is defined by a top of each of said ridges of said first knurl and is 1.1-1.3 times said diameter of the shank.

12. The fastener of claim 11 wherein the first knurl diameter is related to the second knurl diameter by a ratio of 0.8-1.2.

13. The fastener of claim 12 wherein the first angle is in a range of about 55-65 degrees and the second angle is in a range of about 35-45 degrees.

\* \* \* \* \*